July 25, 1939.　　A. CLAUD-MANTLE　　2,167,520
TRAILER COUPLING AND SUPPORT
Filed Jan. 15, 1937　　2 Sheets-Sheet 2
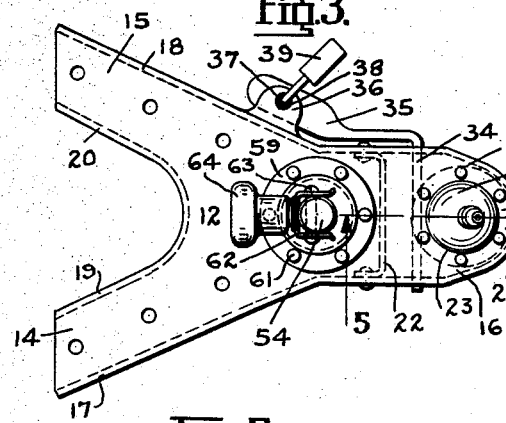
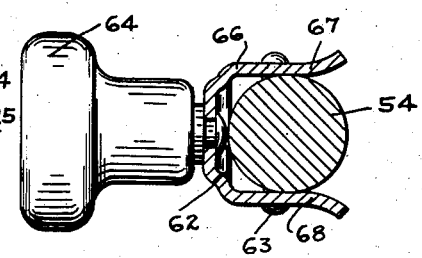
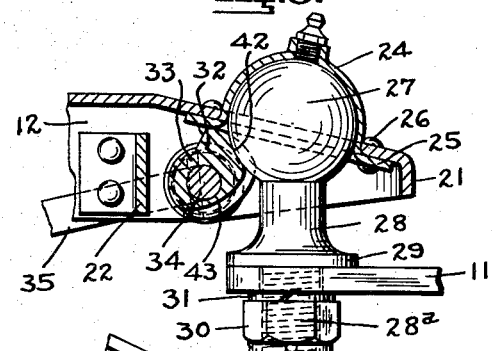
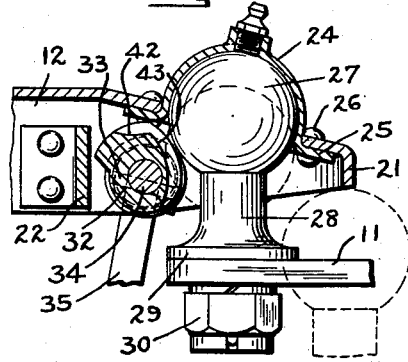
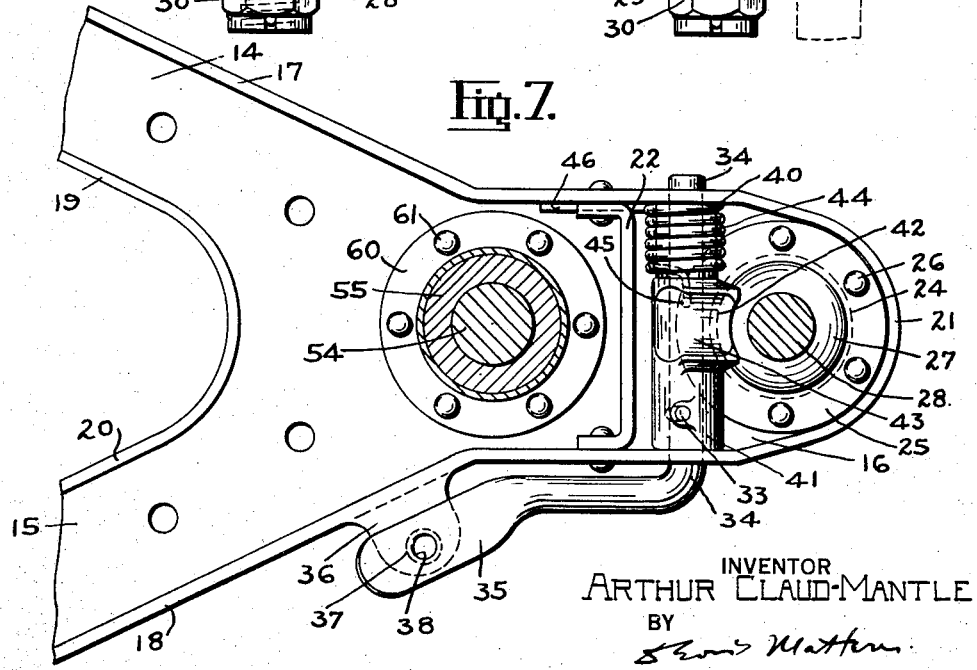
INVENTOR
ARTHUR CLAUD-MANTLE
BY
ATTORNEY Patented July 25, 1939

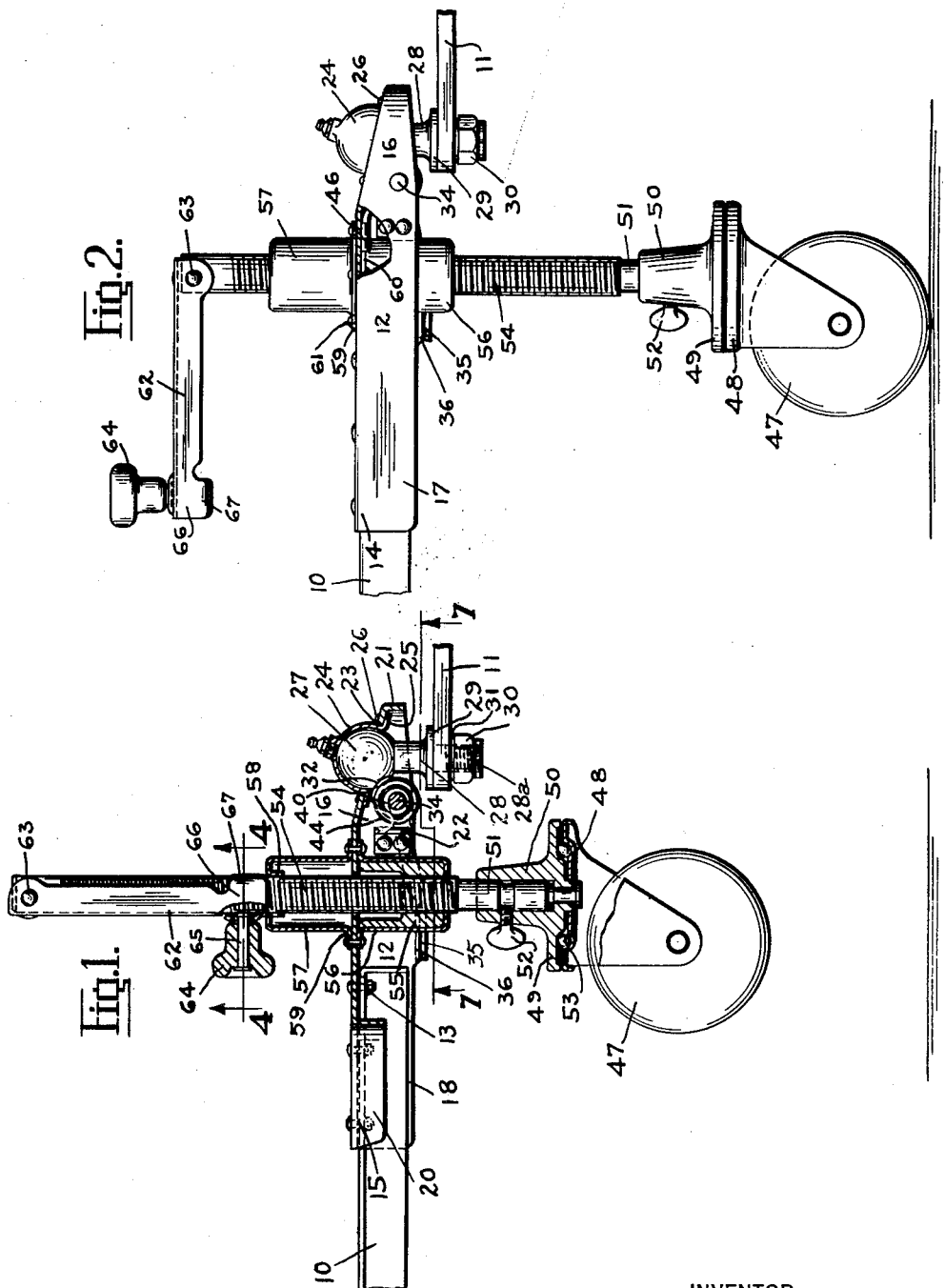

2,167,520

UNITED STATES PATENT OFFICE 2,167,520

TRAILER COUPLING AND SUPPORT

Arthur Claud-Mantle, Trumbull, Conn., assignor to The Bassick Company, Bridgeport, Conn., a corporation of Connecticut Application January 15, 1937, Serial No. 120,679

3 Claims. (Cl. 280—33.15)

This invention relates to couplings and particularly to a coupling and support for use in releasably connecting a trailer to a towing or propelling mechanism, such as an automobile, and to support an end of the trailer when the same is disconnected from the towing or propelling mechanism. Various forms of couplings have been designed and are in use for detachably connecting trailers to an automobile or tractor. Many of these are complicated in structure and inconvenient in use, requiring a considerable amount of time to disconnect.

The present invention contemplates, as one of its objects, the provision of an improved combined trailer coupling and support whereby the above and other disadvantages will be obviated.

Another object is to provide a coupling for the above purpose which will be convenient to use and readily releasable to disconnect the trailer from the towing or propelling mechanism.

Still another object is to provide a coupling of the above nature in combination with a trailer support or jack whereby the trailer end, when disconnected, is supported from the supporting surface upon which it rests and is adjustable to compensate for unevenness of the supporting surface to level the trailer.

A further object is to provide a coupling having its parts formed of sheet metal suitably reinforced to combine lightness of weight with strength.

A still further object is to provide in a coupling of the above nature a novel and readily operable form of releasable connecting mechanism for the separable parts thereof.

Still another object is to provide a coupling of the above nature which will be simple in construction, inexpensive to manufacture, readily manipulated, compact and relatively ornamental in appearance, and very efficient and durable in use.

With the above and other objects in view which will appear as the description proceeds the invention consists in the novel features and combinations thereof to be hereinafter described with reference to the accompanying drawings in which a preferred embodiment thereof is illustrated and as claimed in the appended claims.

In the drawings:

Fig. 1 is a vertical broken section of a combined coupling and support embodying the features of this invention and showing the parts constituting the support in raised non-supporting position.

Fig. 2 is a side view of the coupling showing the support in lowered trailer end supporting position.

Fig. 3 is a top plan view of the coupling.

Fig. 4 is an enlarged sectional view taken generally on line 4—4 of Fig. 1.

Fig. 5 is an enlarged sectional view taken on line 5—5 of Fig. 3, and showing the releasable connecting means for the separable parts in connected position.

Fig. 6 is an enlarged section similar to Fig. 5, but showing the releasable connecting means in part releasing position.

Fig. 7 is an enlarged underside plan view of the coupling and is a sectional view generally on line 7—7 of Fig. 1.

Referring now to the drawings in which the same reference characters designate similar parts throughout the several views, 10 represents the end of a trailer or the like to be connected and supported by the coupling of this invention and 11 represents the draw-bar or like part of a towing or propelling mechanism such as an automobile, tractor or the like.

The coupling by which the trailer end 10 and the draw-bar 11 are connected includes a frame 12 formed of sheet metal and secured to the trailer end 10 by bolts 13. The frame 12 is provided with angularly and rearwardly directed legs 14 and 15 adapted to be disposed over the trailer end 10 and be bolted thereto by the bolts 13, and a forwardly directed end 16 to which the draw bar 11 is releasably connected. Depending side flanges 17 and 18 are provided and extend the entire length of the frame 12, other flanges 19 and 20 being provided and depending from the inner and opposing sides of the legs 14 and 15 respectively. The material of the frame 12 at its forward end is inclined downwardly and then abruptly bent downwardly to form a front depending flange 21, a cross tie bar 22 of sheet metal is extended between and secured to the side flanges 17 and 18 to prevent the same from spreading or collapsing. A particularly strong, but light in weight, frame is provided by the above structure.

An opening 23 is formed in the forward end of the frame 12 through which a sheet metal ball receiving socket or cup 24 extends upwardly. The socket or cup 24 is provided with an annular flange 25 at its open end and is connected to the frame 12 by rivets 26 or like fasteners passed through this flange and the frame. The ball end 27 of a stud 28 is adapted to enter the socket 24. The stud 28 is provided with an annular flange 29 adapted to seat upon the draw-bar 11 when the threaded end portion 28ᵃ of the stud 28 extends through the same and is engaged by a lock nut 30 to secure the draw-bar 11 thereto, a spring lock washer 31 being provided to assist the lock nut to make a firm and tight connection.

To firmly retain the ball end 27 in the socket 24 there is provided a locking cam 32 which is secured by a pin 33 to a shaft 34. The shaft extends between and is journaled in the side flanges 17 and 18 and is provided with an arm 35 which extends rearwardly alongside of the flange 18 and underlies a lug 36 formed integral with and extending from the flange. The lug 36 is provided with an opening 37 which corresponds with an opening 38 in the end of the arm 35 to permit the insertion therethrough of locking means such as the looped shank of a pad lock 39 (see Figure 3). The locking cam 32 is provided with hub side portions 40 and 41 which extend respectively from each side of the cam toward and adjacent to the side flanges 17 and 18 to prevent undue axial movement of the locking cam 32. The pin 33 extends through the hub portion 41 and the shaft 34.

The locking cam is formed with a ball engaging surface 42 and a ball clearance surface 43, the ball engaging surface 42 being adapted, when in ball engaging position as shown in Figures 1 and 5, to press and retain the ball end 27 in the socket 24 under the influence of a spring 44. The spring 44 is coiled about the hub portion 40, having one end attached to the same in an opening 45 provided therefor, and its other end 46 engaging the underside of the frame 12, as shown in Figs. 2 and 7. The spring 44 is tensioned to constantly urge the cam surface 42 toward the ball and 27 to retain it in the socket 24, the arm 35 being pressed upwardly against the lug 36 where it is maintained in non-rattling relation. Rotation of the locking cam 32 by the arm 35 being swung downwardly (see Figures 5 and 6) will swing the cam surface 42 away from the ball end 27 whereby the ball end and stud 28 may be removed as shown in dotted lines in Figures 6 and the trailer end 10 disconnected from the draw-bar 11.

Provision is also made for supporting the trailer end 10 when it is disconnected from the draw-bar 11 by a vertically movable and adjustable caster wheel 47 which is journaled in a lower swivel caster frame 48. The upper caster frame 49 is provided with a hub 50, which is adapted to slip over a vertically disposed spindle 51 and be detachably secured thereto by a thumb screw 52. Suitable ball bearings 53 are disposed between the upper and lower portions 48 and 49 of the caster frame to facilitate a smooth swivel action therebetween.

An enlarged and threaded portion 54 of the spindle 51 extends upwardly through the frame 12 and when so doing threadingly engages with a threaded bushing 55, preferably made of bronze or other non-rusting material, engaged in a depending sheet metal cup shaped bushing holder 56 with a press or force fit. The spindle 51 also passes through an inverted sheet metal cup member 57 having a depending internal annular flange 58 extending about the spindle 51 and by which the spindle 51 is supported and guided. The holder 56 and member 57 are each provided with an annular flange 59 and 60 respectively which seat against opposite sides of the frame 12 and are jointly secured thereto by rivets or the like 61. The bushing 55 is extended upwardly about the spindle 51 and engages the underside of the frame 12 being firmly clamped thereagainst by the holder 56 to prevent it from turning. The bushing 55 and the flange 58 provide widely spaced bearings for the spindle thus supporting it at points above and below the frame 12 to secure rigidity. Rotation of the spindle 51 obviously will raise or lower spindle and with it the wheel 47 with respect to the frame 12.

The means to rotate the spindle 51 is herein shown as being constituted by a sheet metal handle or arm 62, one end of which is pivoted to the upper end of the spindle 51 by a pin 63. The arm is generally U-shaped in cross-section, the sides thereof being adapted to straddle the spindle 51 when the arm is in its folded position relatively to the spindle, as shown in Figs. 1, 3 and 4. A hand engaging knob 64 is provided and is suitably connected to the free end 66 of the arm 62 by a rivet 65. The free end 66 of the arm 62 is formed to provide opposed spring ears 67 and 68 which, as shown in Fig. 4, are adapted to springingly but releasably embrace and grip the spindle 51 sufficiently to prevent the arm 62 from inadvertently swinging outwardly away from the spindle 51.

By manually swinging the arm 62 outwardly and upwardly into the position shown in Fig. 2, the spindle 51 may be readily rotated to lower the wheel 47 into its lowered position to engage a support, or the ground, as shown in Fig. 2. When in wheel raised position, as shown in Fig. 1, the lower end of the handle or arm 62 may be clamped against the upper end of the member 57 by properly rotating the spindle 51 by the knob 64 whereby inadvertent swinging of the arm 62 and possible lowering of the spindle 51 or wheel 47 is further and positively prevented.

The combined coupling and trailer end support or jack of this invention is particularly adapted for convenient and efficient use to connect the front end of a trailer with the rear end of an automobile to transport it to and from various locations. By the use of the novelly constructed coupling the trailer may be readily and rapidly connected to and disconnected from the draw-bar or other connecting part of the automobile, the trailer end being raised or lowered to facilitate this operation by manipulation of the support, or jack, associated and combined therewith. When disconnected at a desired location the support, due to its vertical adjustability, may be readily manipulated to level the trailer and properly support its end 10 regardless of the possible uneven contour of the support, or ground, upon which it rests. The provision of a caster wheel 47 upon the lower end of the spindle 51 permits easy movement of the trailer after it is disconnected and the fact that this wheel is detachable permits the use of the spindle 51 to be used as the support, or the connection of a form of base, other than a wheel, to the lower end of the spindle.

While there has been illustrated and described a preferred form and embodiment of the invention, it is to be understood that the same is not to be limited thereto in all of its details as many changes and alterations are possible without departing from its spirit or the scope of the appended claims.

Having thus described the invention what is claimed and for which it is desired to secure Letters Patent for, is:

1. In a coupling for a trailer or the like, a first coupling part adapted to be connected to the trailer end, a second coupling part adapted to be connected to a trailer propelling means, a ball on one of said coupling parts, a ball receiving socket on the other of said coupling parts, a locking cam rotatably mounted on the coupling part having the socket upon an axis below the horizontal diametric plane of said socket and having a concave cam surface to directly engage the ball above the diagonal diametric plane intersecting the axis of said socket and said locking cam axis and retain it in said socket, and a spring acting directly on said locking cam to rotate it in one direction into ball engagement and to constantly urge said ball into said socket, said locking cam adapted to be rotated in the other direction out of engagement with said ball, outward movement of said ball from said socket adapted to rotate said cam further in locking direction.

2. In a coupling for a trailer or the like, a first coupling part adapted to be connected to the trailer end, a second coupling part adapted to be connected to a trailer propelling means, a ball on one of said coupling parts, a ball receiving socket on the other of said coupling parts, a locking cam rotatably mounted on the coupling part having the socket and having a concave cam surface to directly engage the ball and retain it in said socket, a handle for rotating said cam rigidly connected thereto, a spring acting directly on said cam to constantly urge it in ball engaging direction, and a stop carried by one of said coupling parts against which said handle is pressed by said spring, outward movement of said ball from said socket adapted to press said cam further in locking direction and said handle toward said stop.

3. In a coupling for a trailer or the like, a sheet metal frame member having an aperture, a sheet metal ball receiving socket member engaged in said aperture with its socket facing downwardly and having a flange engaging and secured to the under side of said frame member in surrounding relation to said aperture, and a ball ended stud releasably disposed in said socket member.

ARTHUR CLAUD-MANTLE.